(12) United States Patent
Watzek et al.

(10) Patent No.: US 6,888,277 B2
(45) Date of Patent: May 3, 2005

(54) ELECTRO DRIVE

(75) Inventors: Michael Watzek, Courgevaux (CH); Axel Boettger, Dresden (DE); Daniel Riedo, Gurmels (CH)

(73) Assignee: Saia Burgess Murten AG, Murten (CH)

( * ) Notice: Subject to any disclaimer, the term of this patent is extended or adjusted under 35 U.S.C. 154(b) by 0 days.

(21) Appl. No.: 10/437,039

(22) Filed: May 14, 2003

(65) Prior Publication Data
US 2003/0214191 A1 Nov. 20, 2003

(30) Foreign Application Priority Data
May 17, 2002 (EP) .............................. 02405402

(51) Int. Cl.$^7$ ............................ H02K 7/08; H02K 5/16; H02K 7/06; H02K 37/14

(52) U.S. Cl. ........................ 310/90; 310/71; 310/80; 310/254

(58) Field of Search .................. 310/80, 71, 90, 310/49 R, 254; 74/89

(56) References Cited

U.S. PATENT DOCUMENTS

| | | | |
|---|---|---|---|
| 4,398,109 A | * 8/1983 | Kuwako et al. | ............... 310/80 |
| 5,099,161 A | * 3/1992 | Wolfbauer, III | ............... 310/80 |
| 5,313,125 A | 5/1994 | Bosman et al. | |
| 5,451,824 A | 9/1995 | Sieber et al. | |
| 5,798,592 A | 8/1998 | Peterson | |
| 5,811,903 A | * 9/1998 | Ueno et al. | ................... 310/90 |
| 6,008,554 A | * 12/1999 | Gerling | ..................... 310/49 R |
| 6,262,509 B1 | 7/2001 | Safavi et al. | |
| 6,577,035 B2 | * 6/2003 | Coyac et al. | ................... 310/90 |
| 2002/0018348 A1 | 2/2002 | Miki et al. | |

FOREIGN PATENT DOCUMENTS

| | | | |
|---|---|---|---|
| DE | 24 58 722 A | 6/1976 | |
| EP | 0 385 203 A1 | 9/1990 | |
| EP | 0 557 697 A2 | 9/1993 | |
| EP | 0 569 306 A1 | 11/1993 | |
| EP | 0 623 989 A1 | 11/1994 | |
| EP | 0 911 214 A1 | 4/1999 | |
| JP | 63-190265 A | 8/1988 | |
| JP | 06-311686 | * 11/1994 | ............ H02K/5/16 |
| JP | 2000-116082 | * 4/2000 | ............ H02K/16/00 |
| WO | WO 99/44274 A1 | 9/1999 | |

OTHER PUBLICATIONS

Patent Abstracts of Japan, vol. 12, No. 281 (E–641), Aug, 2, 1988–& JP 63 059746 A (Canon, Inc.), Mar. 15, 1988, Abstract.
Patent Abstracts of Japan, vol. 13, No. 298 (E–784), Jul. 10, 1989–& JP 01 077442 A (Hiroshi Termachi), Mar. 23, 1989, Abstract.
Patent Abstracts of Japan, vol. 1995, No. 02, Mar. 31, 1995–&JP 06 311686 A (Daikin Ind Ltd), Nov. 4, 1994, Abstract.
Patent Abstracts of Japan, vol. 2000, No. 7, Sep. 29, 2000—& JP 2000 116082 A (Japan Servo Co Ltd), Apr. 21, 2000, Abstract.
Patent Abstracts of Japan, vol. 2000, No. 4, Aug. 31, 2000—& JP 2000 014118 A(Minbea Co. Ltd), Jan. 14, 2000, Abstract.
Patent Abstracts of Japan, vol. 1998, No. 9, Jul. 31, 1998—JP 10 094236 A (Sanyo Electric Co Ltd.; Sanyo Seimitsu KK), Apr. 10, 1998, Abstract.
Patent Abstracts of Japan, vol. 1999, No. 11, Sep. 30, 1999—& Jp 11 155275 A (Asmo Co. Ltd.), Jun. 8, 1999, Abstract.

* cited by examiner

*Primary Examiner*—Burton Mullins
(74) *Attorney, Agent, or Firm*—Foley & Lardner LLP

(57) ABSTRACT

The electro drive comprises a stator, a rotor, and a rotor bearing which is axially arranged within the axial length of the rotor.

61 Claims, 2 Drawing Sheets

ELECTRO DRIVE

BACKGROUND OF THE INVENTION

The present invention refers to an electro drive comprising a stator and a rotor. Generally, the rotor of such electro drives is journalled in two bearings arranged on each side of the rotor. This solution ensures a stable support of the rotor, but the two bearing assemblies are space-consuming, and the bearings, especially if they are ball-bearings, are a relatively expensive component of the electro drive. It is also known to provide a bearing on one side of the rotor only, but this will result in an unstable support. In particular, tilting movements due to bearing clearances of the rotor will lead to a lateral displacement of the rotor over its entire length. Therefore, a relatively large air gap must be provided between the rotor and the stator in order to avoid contact between the rotor and the stator, thereby causing additional complications. This in turn will lead to larger dimensions for the same power of the motor, and correspondingly to increased costs.

SUMMARY OF THE INVENTION

It is an object of the present invention to avoid the mentioned principal drawbacks and to provide an electro drive having an economical and compact construction. This object is achieved in that a rotor bearing is axially arranged within the axial length of the rotor. Thus, only one bearing assembly is required, and the effect of possible tilting movements of the rotor will only correspond to half the actual rotor length, thereby allowing a smaller air gap and thus smaller overall dimensions under otherwise identical conditions.

BRIEF DESCRIPTION OF THE DRAWINGS

Further specific constructional features and the advantages thereof will be apparent from the following description and from the drawings, where.

DETAILED DESCRIPTION OF THE PREFERRED EMBODIMENTS

Figure 1:
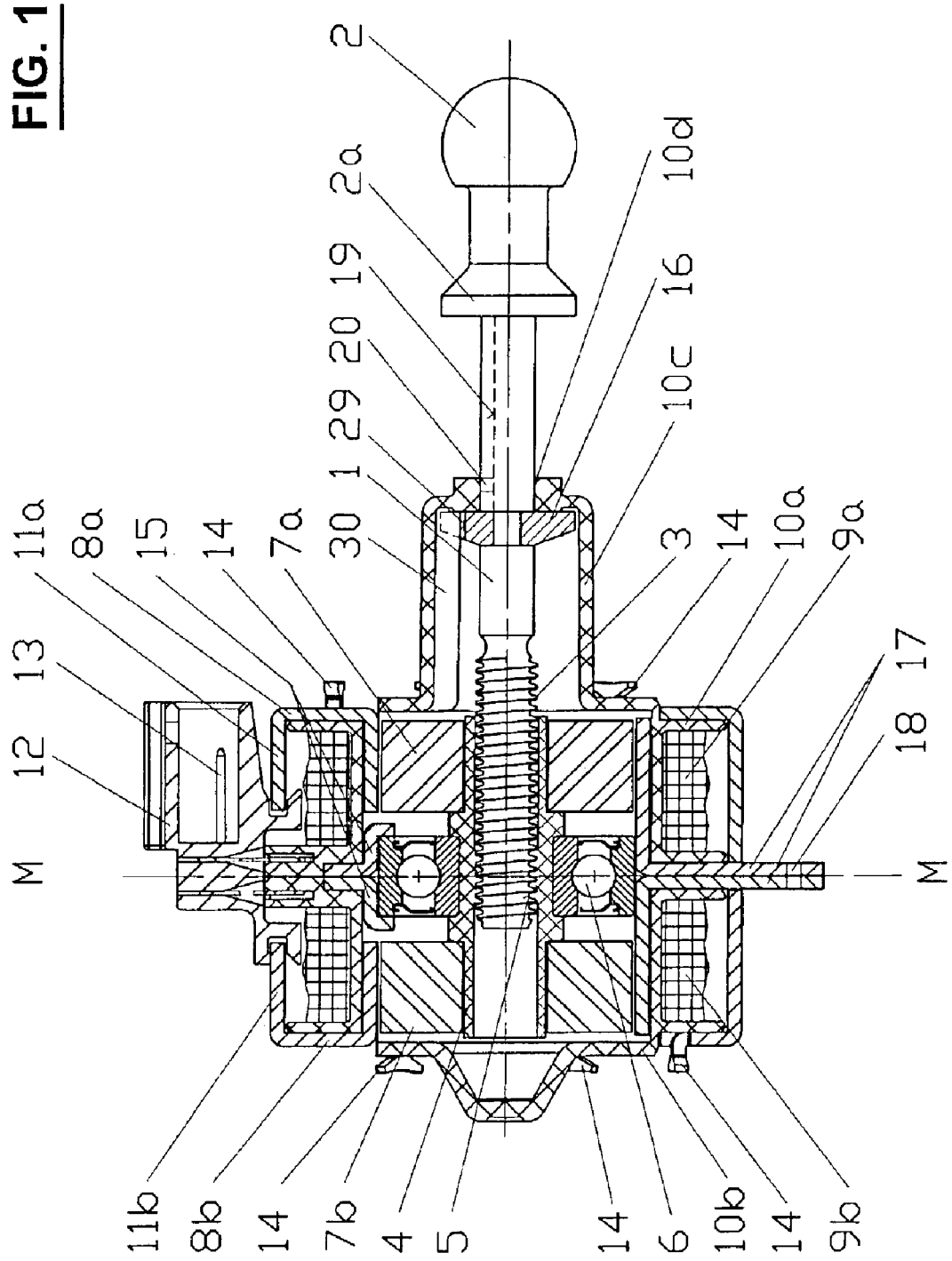
FIG. 1 shows an axial section through an electric linear motor drive.

The linear motor drive shown in FIG. 1 is an electro drive comprising e.g. a stepper motor and may be used for actuating an adjustable member, e.g. the reflector of a vehicle lighting system. For this purpose the motor drive comprises an actuating rod 1 which is linearly moveable along its axis and whose head 2 may be coupled to the adjustable member. The end of actuating rod 1 opposite to head 2 is in the form of a screw 3 and engages in a sleeve 4 provided with an internal thread 5 at the center thereof.

Sleeve 4 is the hub of a rotor and is rotatably journalled by means of a ball bearing 6. On both sides of the ball bearing 6 and symmetrically thereto, two annular permanent magnets 7a resp. 7b of the same kind are mounted on hub 4. The stator of the motor drive comprises two axially offset portions 8a and 8b that are arranged essentially symmetrically to the center plane M of the motor drive.

The two stator portions 8a and 8b comprises each an inner and outer stator plate and are each provided with a coil 9a resp. 9b accommodated in a bobbin 10a resp. 10b. As usual in stepper motors, the stator plates are externally closed and internally provided with non-referenced stator teeth situated opposite rotor rings 7a resp. 7b.

As appears at the top of FIG. 1, shortened stator sections 11a, 11b serve as holders for a connector housing 12 with a connector socket for receiving the plug of a connecting cable. The stator sections 11a resp. 11b form a recess or an aperture in which the connector housing 12 is held. The connecting leads of the stator coils 9a, 9b are connected to contact pins 13 serving for the connection of the plug of a connecting cable. One of the contact pins serves as a ground pin and is connected to a projection of the stator plate in the form of an insulation displacement contact.

The two stator portions 8a and 8b are provided with fastening projections 14 for fastening the motor drive to a suitable support. The inner stator plates of the two stator portions 8a and 8b are provided with inwardly extending angle portions 15 enclosing the outer race of ball bearing 6 with respective radial and axial fitting surfaces and thereby ensuring an accurate mutual radial and axial centering of the rotor and the stator. The fitting surfaces are formed by bending and/or deep-drawing the stator plates.

As appears at the bottom of FIG. 1, bobbin 10a is made integral with an approximately. cylindrical prolongation 10c as one unit, the outer end of prolongation 10c forming a guide 10d for actuating rod 1. The outer end of prolongation 10c also serves as a stop for collar 2a of head 2 and for a disk 16 connected to actuating rod 1.

Two possible complements resp. variants are indicated in FIG. 1.

As shown at the bottom of FIG. 1, the inner stator plates may be provided on diametrically opposite sides with outwardly projecting mounting flanges 17 comprising through-going holes 18 for the purpose of fastening the motor drive. The mounting flanges 17 are formed integrally with the inner stator plates and arranged substantially in the center plane of the rotor 4, 7, in order to enable a firm mounting of the motor drive on a support.

For preventing rotation of actuating rod 1 ("rotational locking"), the latter may e.g. be provided with a groove in which a projection of prolongation 10c of bobbin 10a engages, such that the actuating rod 1 is linearly displaceable in one or the other direction depending on the rotational direction of the rotor 4, 7. In one embodiment the outer part of actuating rod 1 is provided with groove 19 and the respective projection 20 is positioned near the end of prolongation 10c. In another embodiment disk 16 of the actuating rod 1 is provided with groove 29 and the respective projection 30 is formed by a rip extending along prolongation 10c of bobbin 10a. Prolongation 10c together with projection 20 resp. 30 may be formed integrally with bobbin 10a, which is made e.g. of a synthetic material.

The advantages resulting from the overall conception of the motor drive, as far as they have not yet been mentioned, may be summarized as follows:

The rotor 4, 7 is journalled by means of a single bearing 6 which is arranged substantially at the center of the axial length of the rotor 4, 7. Usage of a single central bearing allows a compact, economical construction as only one rotor bearing is needed. Possible tilting moments transmitted through the actuating rod 1 have only a limited effect on the rotor portions 7a, 7b due to the central arrangement of the bearing 6. Accordingly, the air gap between the stator and the rotor can be reduced, thereby allowing more motor power.

In contrast to conventional motor drives wherein the bearing assembly is arranged at the end of the rotor, the bearing 6 is arranged here within the length of the rotor axle and thus the stator pack 8a, 8b is enlarged by the width that is conventionally occupied by the bearing assembly. Accordingly, the power of motor drive can be increased compared to a conventional motor drive having the same construction size.

The bearing 6 is fastened axially and radially directly by the inner stators of the stator portions 8a, 8b, so that no additional fastening means are needed.

Bobbin 10a is used as a stationary member of the motor drive for rotationally locking actuating rod 1, which allows a simplification of the rotational locking assemblies conventionally used.

If flanges 17, 18 are provided, a fastening of the motor drive without additional parts is possible. Also, if required, the center of gravity of the motor drive may be situated below the fastening location, which is advantageous with respect to vibrations. Since no additional parts are used, the force-transmitting path between the fastening location and the driving screw is short and rigid. The same applies to mounting the motor drive by means of the fastening projections 14, i.e. no separate fastening members are required in this case either. As mentioned above, the stator plate also allows a direct electric connection to the ground contact pin.

Figure 2:
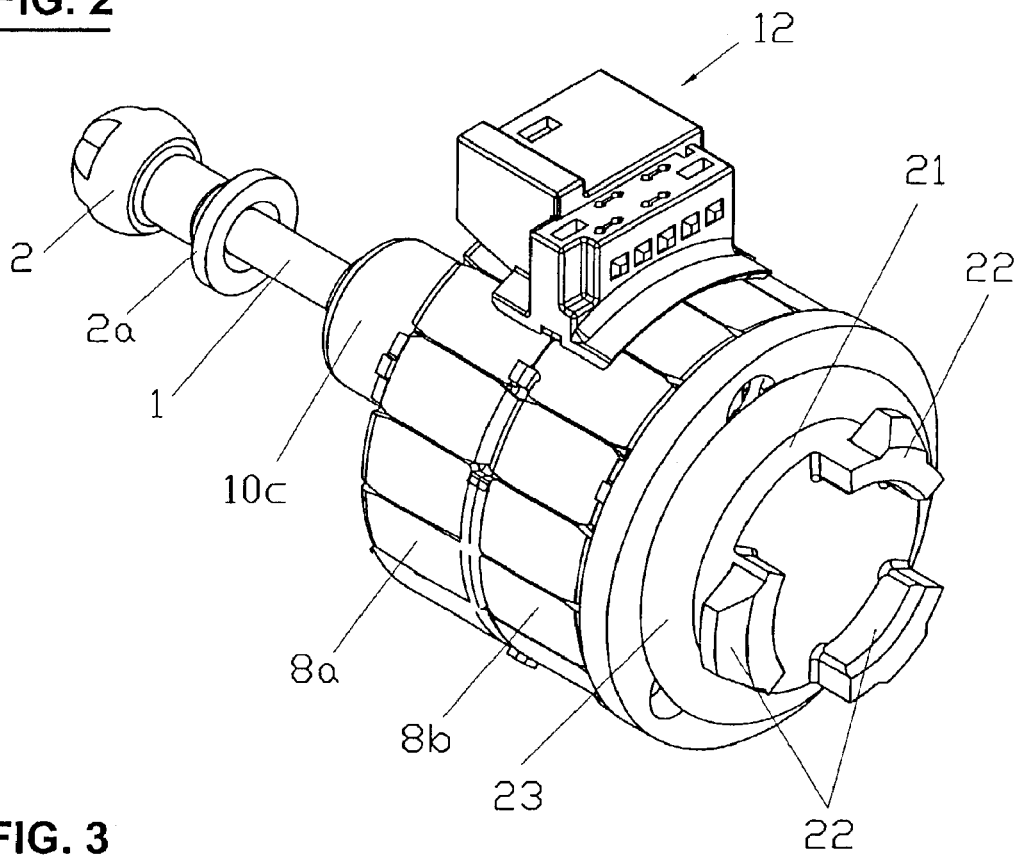
FIGS. 2 and 3 show spatial views of slightly different embodiments of a linear motor drive.

FIG. 2 shows an alternative embodiment of the motor drive. The construction largely corresponds to that of FIG. 1, and corresponding parts are referenced as in FIG. 1. In this embodiment, the end face of the bobbin on the opposite side of the actuating rod 1 is provided with a cylindrical prolongation 21 comprising integrally formed mounting projections 22. The prolongation 21 may also be a separate part connected to projections 14. A sealing ring 23 is placed on prolongation 21. In this embodiment, the motor drive is insertable in a very simple manner in an aperture of a housing comprising cutouts for the passage of projections 22, e.g. a headlight casing, where it is fastened in the manner of a bayonet attachment. Sealing ring 23 ensures thereby a reliable sealing of the interior containing the active parts of the motor drive. This results in a particularly advantageous application of the motor drive, as it is easily mounted by first inserting it into the aperture of the housing and then rotating it until the bayonet joint is closed.

Figure 3:
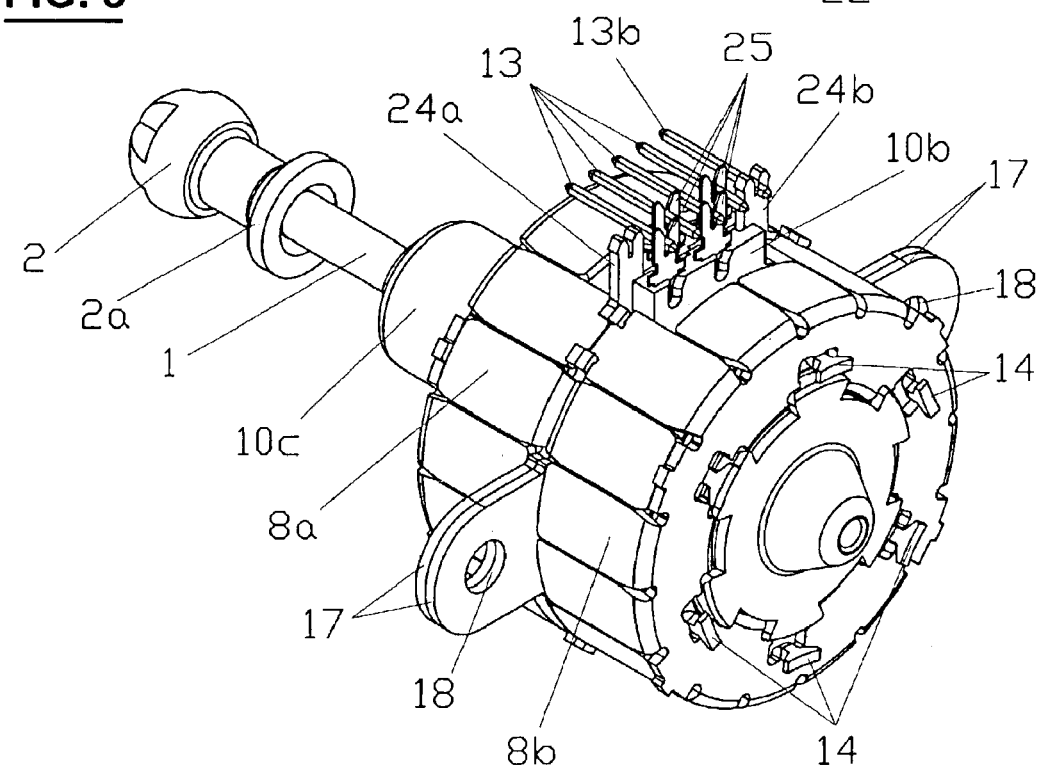

FIG. 3 largely corresponds to FIG. 2. In addition, this figure shows flanges 17 and respective projections 24a, 24b of stator portions 8a and 8b, the projections 24a, 24b having each a slit for forming insulation displacement contacts. Each of the two projections 24a and 24b is formed integrally with the respective inner stator plate of the stator portion 8a resp. 8b. Only insulation displacement contact 24b is connected to a contact pin 13b serving as a ground connection. The remaining contact pins 13 are connected to insulation displacement contacts 25 that are anchored in bobbins 10a (at the rear of FIG. 3, not visible) and 10b and connected to the coil terminals. Insulation displacement contacts 24 and 25 may also serve for a direct connection with conductors of a connecting cable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electro drive comprising a stator, a rotor, and a single rotor bearing, said rotor bearing being axially arranged within the axial length of the rotor, wherein said rotor is rotatably journalled exclusively by means of said rotor bearing, and said rotor bearing is held between portions of said stator.

2. The drive of claim 1, wherein said rotor comprises a threaded sleeve in which a threaded rod is axially displaceable, said threaded rod serving as a linear actuating member.

3. The drive of claim 2, further comprising at least one bobbin of synthetic material, wherein said bobbin serves as a stationary member for rotationally locking the threaded rod.

4. The drive of claim 3, wherein said bobbin comprises a projection which is adapted to engage in a groove of said threaded rod.

5. The drive of claim 1, wherein said portions of said stator comprise two axially offset portions.

6. The drive of claim 5, wherein said rotor bearing is a ball bearing comprising an outer race which is held between said portions of the stator.

7. The drive of claim 5, wherein said rotor bearing is held between fitting surfaces of said portions of said stator for a mutual radial and axial centering of said rotor and said stator.

8. The drive of claim 7, wherein said portions of the stator comprise stator plates, said fitting surfaces are formed by bending and/or deep-drawning said stator plates.

9. The drive of claim 1, wherein said stator comprises stator plates with mounting flanges and holders for a connector socket for receiving the plug of a connecting cable.

10. The drive of claim 1, wherein said stator comprises projections being designed as insulation displacement contacts, at least one of said projections forming a ground connection for a contact pin or a connecting lead.

11. The drive of claim 1, wherein said stator comprises a stator plate with at least one projection for forming a ground connection, said projection being formed integrally with said stator plate.

12. The drive of claim 1, wherein said stator comprises stator plates with integrally formed mounting flanges.

13. The drive of claim 12, wherein said mounting flanges are arranged substantially in the center plane of said rotor.

14. A method comprising providing a drive according to claim 1, and actuating an adjustable member of a vehicle using said drive.

15. The drive of claim 1, wherein said rotor comprises two axially offset portions.

16. An electro drive comprising:
 a rotor;
 a rotor bearing which is axially arranged within the axial length of the rotor; and
 a stator comprising axially offset portions with fitting surfaces, said rotor bearing having an outer race held between said fitting surfaces for mutual radial and axial centering of said rotor and said stator.

17. The drive of claim 16, wherein said rotor comprises a threaded sleeve in which a threaded rod is axially displaceable, said threaded rod serving as a linear actuating member.

18. The drive of claim 17, further comprising at least one bobbin of synthetic material, wherein said bobbin serves as a stationary member for rotationally locking the threaded rod.

19. The drive of claim 18, wherein said bobbin comprises a projection which is adapted to engage in a groove of said threaded rod.

20. The drive of claim 16, wherein said rotor is rotatably journalled exclusively by means of said rotor bearing.

21. The drive of claim 16, wherein said rotor bearing is arranged substantially in the center of the axial length of said rotor.

22. The drive of claim 16, wherein said rotor comprises two axially offset portions.

23. The drive of claim 16, wherein said rotor bearing is a ball bearing.

24. The drive of claim 16, wherein said portions of the stator comprise stator plates, said fitting surfaces are formed by bending and/or deep-drawning said stator plates.

25. The drive of claim 16, wherein said stator comprises stator plates with mounting flanges and holders for a connector socket for receiving a plug of a connecting cable.

26. The drive of claim 16, wherein said stator comprises projections configured to provide insulation displacement contacts, at least one of said projections forming a ground connection for a contact pin or a connecting lead.

27. The drive of claim 16, wherein said stator comprises a stator plate with at least one projection for forming a ground connection, said projection being formed integrally with said stator plate.

28. The drive of claim 16, wherein said stator comprises stator plates with integrally formed mounting flanges.

29. The drive of claim 28, wherein said mounting flanges are arranged substantially in the center plane of said rotor.

30. A method comprising providing a drive according to claim 16, and actuating an adjustable member of a vehicle with said drive.

31. The drive of claim 16, wherein said fitting surfaces comprise radial and axial fitting surfaces.

32. An electro drive comprising:
a stator;
a rotor with a threaded sleeve in which a threaded rod is axially displaceable;
a rotor bearing; and
at least one bobbin comprising a projection which is adapted to engage in a groove of said threaded rod for rotationally locking said threaded rod.

33. The drive of claim 32, wherein said rotor bearing is axially arranged within the axial length of the rotor.

34. The drive of claim 32, wherein said rotor is rotatably journalled exclusively by means of said rotor bearing.

35. The drive of claim 32, wherein said rotor bearing is arranged substantially in the center of the axial length of said rotor.

36. The drive of claim 32, wherein said stator and said rotor each comprise two axially offset portions, said rotor bearing being held between said portions of the stator.

37. The drive of claim 36, wherein said rotor bearing is a ball bearing comprising an outer race which is held between said portions of the stator.

38. The drive of claim 36, wherein said rotor bearing is held between fitting surfaces of said portions of said stator for a mutual radial and axial centering of said rotor and said stator.

39. The drive of claim 38, wherein said portions of the stator comprise stator plates, said fitting surfaces are formed by bending and/or deep-drawning said stator plates.

40. The drive of claim 32, wherein said stator comprises stator plates with mounting flanges and holders for a connector socket for receiving the plug of a connecting cable.

41. The drive of claim 32, wherein said stator comprises projections being designed as insulation displacement contacts, at least one of said projections forming a ground connection for a contact pin or a connecting lead.

42. The drive of claim 32, wherein said stator comprises a stator plate with at least one projection for forming a ground connection, said projection being formed integrally with said stator plate.

43. The drive of claim 32, wherein said stator comprises stator plates with integrally formed mounting flanges.

44. The drive of claim 43, wherein said mounting flanges are arranged substantially in the center plane of said rotor.

45. A method comprising providing a drive according to claim 32, and actuating an adjustable member of a vehicle with said drive.

46. An electro drive comprising a stator, a rotor, and a single rotor bearing, said rotor bearing being axially arranged substantially in center of the axial length of the rotor, wherein said rotor is rotatably journalled exclusively by means of said rotor bearing.

47. The drive of claim 46, wherein the stator includes plates with inwardly extending fitting surfaces that hold the rotor bearing for mutual radial and axial centering of said rotor and said stator.

48. The drive of claim 47, wherein the fitting surfaces of the stator enclose an outer race of the rotor bearing.

49. The drive of claim 46, wherein said rotor comprises a threaded sleeve in which a threaded rod is axially displaceable, said threaded rod serving as a linear actuating member.

50. The drive of claim 49, further comprising at least one bobbin for rotationally locking the threaded rod, said bobbin comprising a projection which is adapted to engage in a groove of said threaded rod.

51. The drive of claim 46, wherein said stator includes stator plates with mounting flanges arranged substantially in the center plane of said rotor.

52. An electro drive comprising:
a rotor;
a rotor bearing which is axially arranged within the axial length of the rotor; and
a stator comprising axially offset portions with fitting surfaces, said rotor bearing being held between said fitting surfaces of said stator for mutual radial and axial centering of said rotor and said stator;
wherein said stator includes mounting flanges provided on said stator and holders for a connector socket for receiving the plug of a connecting cable.

53. The drive of claim 52, wherein said fitting surfaces comprise radial and axial fitting surfaces.

54. The drive of claim 52, wherein said rotor comprises a threaded sleeve in which a threaded rod is axially displaceable, said threaded rod serving as a linear actuating member.

55. The drive of claim 54, further comprising at least one bobbin for rotationally locking the threaded rod, said bobbin comprising a projection which is adapted to engage in a groove of said threaded rod.

56. The drive of claim 52, wherein said mounting flanges arranged substantially in the center plane of said rotor.

57. An electro drive comprising a stator, a rotor, and a rotor bearing, said rotor bearing being axially arranged within the axial length of the rotor, said stator including stator plates with mounting flanges arranged substantially in the center plane of said rotor.

58. The drive of claim 57, wherein said rotor bearing is arranged substantially in the center of the axial length of the rotor.

59. The drive of claim 57, wherein said rotor comprises a threaded sleeve in which a threaded rod is axially displaceable, said threaded rod serving as a linear actuating member.

60. The drive of claim 59, further comprising at least one bobbin for rotationally locking the threaded rod, said bobbin comprising a projection which is adapted to engage in a groove of said threaded rod.

61. The drive of claim 57, wherein the stator plates include fitting surfaces that enclose an outer race of the rotor bearing.

* * * * *